United States Patent [19]

Seethamraju et al.

[11] Patent Number: 5,981,067

[45] Date of Patent: *Nov. 9, 1999

[54] ADVANCED COMPATIBLE POLYMER WOOD FIBER COMPOSITE

[75] Inventors: Kasyap V. Seethamraju, St. Paul; Neil J. Beaverson, Hugo; Kurt E. Heikkila, Circle Pines, all of Minn.

[73] Assignee: Andersen Corporation, Bayport, Minn.

[*] Notice: This patent is subject to a terminal disclaimer.

[21] Appl. No.: 08/949,360

[22] Filed: Oct. 14, 1997

Related U.S. Application Data

[63] Continuation of application No. 08/779,688, Jan. 7, 1997, abandoned, which is a continuation-in-part of application No. 08/476,192, Jun. 7, 1995, abandoned, which is a continuation-in-part of application No. 08/224,396, Apr. 7, 1994, abandoned, which is a continuation of application No. 07/938,364, Aug. 31, 1992, abandoned.

[51] Int. Cl.$^6$ ..................................................... B32B 5/16
[52] U.S. Cl. ........................... 428/393; 428/326; 428/359; 428/361.4; 428/378; 428/425.1; 428/479.3; 428/479.6; 428/507
[58] Field of Search ..................................... 428/326, 359, 428/361.4, 378, 393, 425.1, 479.3, 479.6, 507

[56] References Cited

U.S. PATENT DOCUMENTS

| | | | |
|---|---|---|---|
| 3,765,934 | 10/1973 | Gaylord | 117/148 |
| 3,869,432 | 3/1975 | Gaylord | 260/78.5 R |
| 3,894,975 | 7/1975 | Gaylord | 260/17.4 GC |
| 3,900,685 | 8/1975 | Gaylord | 428/420 |

(List continued on next page.)

FOREIGN PATENT DOCUMENTS

| | | |
|---|---|---|
| 2 104 903 | 3/1983 | United Kingdom . |
| 2 192 397 | 1/1988 | United Kingdom . |

OTHER PUBLICATIONS

Composites of Poly(Vinyl Chloride) and Wood Fibers. Part II: Effect of Chemical Treatment, B. V. Kokta et al., *Polymer Composites*, Apr. 1990, vol. 11, No. 2, pp. 84–89.
"Wood Flour/Polypropylene Composites: Influence of Maleated Polypropylene and Process and Composition Variables on Mechanical Properties", G. E. Myers et al., *Intern. J. Polymeric Mater.*, 1991, vol. 15, pp. 21–44.
"Effectiveness of Maleated Polypropylenes as Coupling Agents for Wood Flour/Polypropylene Composites", D. J. Olsen, ANTEC '91, pp. 1886–1891.
"Toughened Thermoplastic Composite. I. Cross–Linkable Phenol Formaldehyde and Epoxy Resins–Coated Cellulosic–Filled Polypropylene Composites", M. M. Sain et al., *Journal of Applied Polymer Science*, 1993, vol. 48, pp. 2181–2196.
"The Efficiency of Cellulosic Fillers in Common Thermoplastics. Part II. Filling with Processing Aids and Coupling Agents", H. Dalvag et al., *Intern J. Polymeric Mater.*, 1985, vol. 11, pp. 9–37.

"Use of Wood Fiber as Filler in Common Thermoplastics: Studies on Mechanical Properties", R. G. Raj et al., *Science and Engineering of Composite Materials*, 1989, vol. 1, No. 3, pp. 85–98.
"Effect of Solid–State Modified Polypropylene on the Physical Performance on Sawdust–Filled Polypropylene Composites", M. M. Sain et al., *Advances in Polymer Technology*, 1993, vol. 12, No. 2, pp. 167–183.
"The Nature of Adhesion in Composites of Modified Cellulose Fibers and Polypropylene", Johan M. Felix et al., *Journal of Applied Polymer Science*, 1991, vol. 42, pp. 609–620.
"Composites of Wood and Polypropylenes I.", Hajime Kishi et al, *Mokuzai Gakkaishi*, 1988, vol. 34, No. 2, pp. 133–139.
"Composites of Wood and Polypropylenes III.", Gyu–Seong Han et al., *Mokuzai Gakkaishi*, 1989, vol. 35, No. 12, pp. 1100–1104.
"Properties of Blends of Starch and Synthetic Polymers Containing Anhydride Groups", Utpal R. Vaidya et al., *Journal of Applied Polymer Science*, 1994, vol. 52, pp. 617–628.
"Composites of Polyvinyl Chloride–Wood Fibers. III: Effect of Silane as Coupling Agent", B. V. Kokta et al., *Journal of Vinyl Technology*, Sep. 1990, vol. 12, No. 3, pp. 146–153.
"Composites of Poly(Vinyl Chloride–Wood Fibers: II. Effect of Chemical Treatment", B. V. Kokta et al., *Polymer Composites*, 1989.
"Performance of Hybrid Reinforcements in PVC Composites: Part I—Use of Surface–Modified Mica and Wood Pulp as Reinforcements", Debesh Maldas et al., *Journal of Testing and Evaluation*, Jan. 1993, vol. 21, No. 1, pp. 68–72.
Performance of Hybrid Reinforcements in PVC Composites: III. Use of Surface–Modified Glass Fiber and Wood Pulp as Reinforcements, D. Maldas et al., *Journal of Reinforced Plastics and Composites*, Oct. 1992, vol. II, pp. 1093–1102.
"Surface modification of wood fibers using maleic anhydride and isocyanate as coating components and their performance in polystyrene composites", D. Maldas et al., *J. Adhesion Sci. Technol.*, 1991, vol. 0, No. 0, pp. 1–14.
"PMSE—Polymeric Materials Science and Engineering", Spring Meeting 1992, San Francisco, CA, Proceedings of the American Chemical Society, Division of Polymeric Materials: Science and Engineering, vol. 66.

*Primary Examiner*—Richard Weisberger
*Attorney, Agent, or Firm*—Merchant & Gould P.C.

[57] ABSTRACT

The invention relates to a composite pellet comprising a thermoplastic polymer and wood fiber composite that can be used in the form of a linear extrudate or thermoplastic pellet to manufacture structural members. The fiber can be modified to increase compatibility. The polymer and wood fiber composite may contain an intentional recycle of a waste stream which can comprise adhesive, paint, preservative, or other chemical waste stream common in the wood-window or door manufacturing process. The initial mixing step before extrusion of the composite material insures substantial mixing and melt contact between molten polymer and wood fiber. The extruded pellet comprises a consistent proportion of polymer, wood fiber and water.

9 Claims, No Drawings

U.S. PATENT DOCUMENTS

| | | | |
|---|---|---|---|
| 3,943,079 | 3/1976 | Hamed | 260/17.4 BB |
| 3,958,069 | 5/1976 | Gaylord | 428/407 |
| 4,051,214 | 9/1977 | Casper et al. | 264/137 |
| 4,414,267 | 11/1983 | Coran et al. | 428/288 |
| 4,528,303 | 7/1985 | Segaud | 523/212 |
| 4,717,742 | 1/1988 | Beshay | 523/203 |
| 4,752,526 | 6/1988 | Daimon et al. | 428/332 |
| 4,820,749 | 4/1989 | Beshay | 523/203 |
| 5,120,776 | 6/1992 | Raj et al. | 524/13 |
| 5,153,241 | 10/1992 | Beshay | 524/8 |
| 5,288,772 | 2/1994 | Hon | 524/35 |

1

ADVANCED COMPATIBLE POLYMER WOOD FIBER COMPOSITE

"This application is a Continuation of application Ser. No. 08/779,688, filed Jan. 7, 1997, now abandoned, which application(s) is a divisional application of Ser. No. 08/476, 192, filed Jun. 7, 1995, now abandoned, which is a continuation-in-part application of U.S. Ser. No. 08/224, 396, filed Apr. 7, 1994, now abandoned, which is a continuation application of U.S. Ser. No. 07/938,364, filed Aug. 31, 1992, now abandoned, which application(s) are incorporated herein by reference."

FIELD OF THE INVENTION

The invention relates to compatible composite thermoplastic materials used for the fabrication of structural members. The thermoplastic materials comprise a continuous phase of polyvinyl chloride having a discontinuous phase of a cellulosic fiber. The composite material is maintained thermoplastic throughout its useful life by avoiding the use of any substantial concentration of crosslinking agents that would either crosslink cellulosic fibers, polymer molecules or cellulosic fiber to polymer. The physical properties of the thermoplastic material are improved by increasing polymer-fiber compatibility, i.e. the tendency of the polymer and fiber to mix. The improved mixing tendencies improves the coatability of the fiber by polymer, increases the degree the polymer wets the fiber in the melt stage and substantially increases the engineering properties of the materials as a whole. In particular, the improved engineering properties include increased tensile strength when compared to immodified materials (without a compatibilizing composition). The improved engineering properties permit the manufacture of improved structural members. Such members can be any structural unit. Preferably the members are for use in windows and doors for residential and commercial architecture. More particularly, the invention relates to an improved composite material adapted to extrusion or injection molding processes for forming structural members that have improved properties when used in windows and doors. The composite materials of the invention can be made to manufacture structural components such as rails, jambs, stiles, sills, tracks, stop and sash, nonstructural trim elements such as grid, cove, bead, quarter round, etc.

BACKGROUND OF THE INVENTION

Conventional window and door manufacture has commonly used wood and metal components in forming structural members. Commonly, residential windows are manufactured from milled wood products that are assembled with glass to form typically double hung or casement units. Wood windows while structurally sound, useful and well adapted for use in many residential installations, can deteriorate under certain circumstances. Wood windows also require painting and other periodic maintenance. Wooden windows also suffer from cost problems related to the availability of suitable wood for construction. Clear wood products are slowly becoming more scarce and are becoming more expensive as demand increases. Metal components are often combined with glass and formed into single unit sliding windows. Metal windows typically suffer from substantial energy loss during winter months.

Extruded thermoplastic materials have been used in window and door manufacture. Filled and unfilled thermoplastics have been extruded into useful seals, trim, weatherstripping, coatings and other window construction components. Thermoplastic materials such as polyvinyl chloride have been combined with wood members in manufacturing PERMASHIELD® brand windows manufactured by Andersen Corporation for many years. The technology disclosed in Zanini, U.S. Pat. Nos. 2,926,729 and 3,432,883, have been utilized in the manufacturing of plastic coatings or envelopes on wooden or other structural members. Generally, the cladding or coating technology used in making PERMASHIELD® windows involves extruding a thin polyvinyl chloride coating or envelope surrounding a wooden structural member.

Recent advances have made a polyvinyl chloride/cellulosic fiber composite material useful in the manufacture of structural members for windows and doors. Puppin et al., U.S. Pat. No. 5,406,768 comprise a continuous phase of polyvinyl chloride and a particular wood fiber material having preferred fiber size and aspect ratio in a thermoplastic material that provides engineering properties for structural members and for applications in window and door manufacture. These thermoplastic composite materials have become an important part of commercial manufacture of window and door components. While these materials are sufficiently strong for most structural components used in window and door manufacture, certain components require added stiffness, tensile strength, elongation at break or other engineering property not always provided by the materials disclosed in Puppin et al.

We have examined the modification of thermoplastic materials in the continuous polymer phase, the modification of the cellulosic materials in the discontinuous cellulosic phase for improving the structural polymers of these composite materials. The prior art has recognized that certain advantages can be obtained by a judicious modification of the materials. For example, a number of additives are known for use in both thermoplastic and cellulosic materials including molding lubricants, polymer stabilizers, pigments, coatings, etc.

The prior art contains numerous suggestions regarding polymer fiber composites. Gaylord, U.S. Pat. Nos. 3,765, 934, 3,869,432, 3,894,975, 3,900,685, 3,958,069 and Casper et al., U.S. Pat. No. 4,051,214 teach a bulk polymerization that occurs in situ between styrene and maleic anhydride monomer combined with wood fiber to prepare a polymer fiber composite. Segaud, U.S. Pat. No. 4,528,303 teaches a composite composition containing a polymer, a reinforcing mineral filler and a coupling agent that increases the compatibility between the filler and the polymer. The prior art also recognizes modifying the fiber component of a composite. Hamed, U.S. Pat. No. 3,943,079 teaches subjecting unregenerated cellulose fiber to a shearing force resulting in mixing minor proportions of a polymer and a lubricant material with the fiber. Such processing improves fiber separation and prevents agglomeration. The processing with the effects of the lubricant tends to enhance receptiveness of the fiber to the polymer reducing the time required for mixing. Similarly, Coran et al., U.S. Pat. No. 4,414,267 teaches a treatment of fiber with an aqueous dispersion of a vinyl chloride polymer and a plasticizer, the resulting fibers contain a coating of polyvinyl chloride and plasticizer and can be incorporated into the polymer matrix with reduced mixing energy. Beshay, U.S. Pat. Nos. 4,717,742 and 4,820, 749 teach a composite material containing a cellulose having grafted silane groups. Raj et al., U.S. Pat. No. 5,120,776 teach cellulosic fibers pretreated with maleic or phthalic anhydride to improve the bonding and dispersibility of the fiber in the polymer matrix. Raj et al. teach a high density polyethylene chemical treated pulp composite. Hon, U.S.

Pat. No. 5,288,772 discloses fiber reinforced thermoplastic made with a moisture pretreated cellulosic material such as discarded newspapers having a lignant content. Kokta et al., "Composites of Poly(Vinyl Chloride) and Wood Fibers. Part II. Effect of Chemical Treatment", *Polymer Composites*, April 1990, Volume 11, No. 2, teach a variety of cellulose treatments. The treatments include latex coating, grafting with vinyl monomers, grafting with acids or anhydrides, grafting with coupling agents such as maleic anhydride, abietic acid (See also Kokta, U.K. Application No. 2,192,397). Beshay, U.S. Pat. No. 5,153,241 teaches composite materials including a modified cellulose. The cellulose is modified with an organo titanium coupling agent which reacts with and reinforces the polymer phase. Similarly, the modification of the thermoplastic is also suggested in metal polypropylene laminates, crystallinity of polypropylene has been modified with an unsaturated carboxylic acid or derivative thereof. Such materials are known to be used in composite formation.

Maldas et al. in "Performance of Hybrid Reinforcements in PVC Composites: Part I and Part III", *Journal of Testing and Evaluation*, Vol. 21, No. 1, 1993, pp. 68–72 and *Journal of Reinforced Plastics and Composites*, Volume II, October 1992, pp. 1093–1102 teach small molecule modification of filler such as glass, mica, etc. in PVC composites. No improvement in physical properties are demonstrated as a result of sample preparation and testing. Maldas and Kokta, "Surface modification of wood fibers using maleic anhydride and isocyanate as coating components and their performance in polystyrene composites", *Journal Adhesion Science Technology*, 1991, pp. 1–14 show polystyrene flour composites containing a maleic anhydride modified wood flour. A number of publications including Kokta et al., "Composites of Polyvinyl Chloride-Wood Fibers. III: Effect of Silane as Coupling Agent", *Journal of Vinyl Technolocy*, Vol. 12, No. 3, September 1990, pp. 142–153 disclose modified polymer (other references disclosed modified fiber) in highly plasticized thermoplastic composites. Additionally, Chahyadi et al., "Wood Flour/Polypropylene Composites: Influence of Maleated Polypropylene and Process and Composition Variables on Mechanical Properties", *International Journal Polymeric Materials*, Volume 15, 1991, pp. 21–44 discuss polypropylene composites having polymer backbone modified with maleic anhydride.

Accordingly, a substantial need exists for an improved thermoplastic composite material that can be made of polymer and wood fiber with an optional, intentional recycle of a waste stream. A further need exists for an improved thermoplastic composite material that can be extruded into a shape that is a direct substitute for the equivalent milled shape in a wooden or metal structural member. This need requires a thermoplastic composite with creep resistance, improved heat distortion temperature having a coefficient of thermal expansion that approximates wood, a material that can be extruded into reproducible stable dimensions, a high compressive strength, a low thermal transmission rate, an improved resistance to insect attack and rot while in use and a hardness and rigidity that permits sawing, milling, and fastening retention comparable to wood members. Further, companies manufacturing window and door products have become significantly sensitive to waste streams produced in the manufacture of such products. Substantial quantities of wood waste including wood trim pieces, sawdust, wood milling by-products; recycled thermoplastic including recycled polyvinyl chloride, has caused significant expense to window manufacturers. Commonly, these materials are either burned for their heat value in electrical generation or are shipped to qualified landfills for disposal. Such waste streams are contaminated with substantial proportions of hot melt and solvent-based adhesives, waste thermoplastic such as polyvinyl chloride, paint, preservatives, and other organic materials. A substantial need exists to find a productive environmentally compatible use for such waste streams to avoid returning the materials into the environment in an environmentally harmful way. Such recycling requires that the recycled material remains largely thermoplastic. Lastly a substantial need exists to improve poly vinylchloride-cellulosic composites for use in high stress or high load bearing applications.

BRIEF DISCUSSION OF THE INVENTION

We have found that the problems relating to polymer-fiber composites can be solved by forming compatible thermoplastic/fiber composite from a modified polymer or a modified wood fiber, or both. An increase in compatibility between polymer and fiber can be characterized by a measurable increase (outside standard deviation) in tensile strength or applied tensile strength at point of yield of material. The improved compatibility of the materials improves wetting and incorporation of fiber into polymer, increasing reinforcement and a resulting improvement in tensile strength.

For the purpose of this application, the term "modified polymer (derivative polymer)" indicates a polymeric material having side groups or moieties deliberately introduced onto the polymer backbone or copolymerized into the polymer backbone that increase the tendency of the polymer to associate with or wet the fiber surface. Typically, such modifications introduce pendant groups onto the polymer that form hydrogen bonds with the cellulosic material. Similarly, the cellulose can be modified or derivative. The term "derivatized or modified cellulose" for purposes of this invention include reacting the cellulose with a reagent that forms a derivative on either a primary or secondary hydroxyl of the cellulosic material. The hydroxyl reactive reagent contains a substituent group of similar polarity to the polymer material used in an ultimate composite. For the purpose of this application, the term "compatibility with a thermoplastic polymer" can be characterized by differential scanning calorimetry (DSC) data and by measuring surface energy using a goniometer device. In examining compatibility using a differential scanning calorimeter, the calorimetry of a separate polymer phase and a modified cellulose phase or the cellulose modifier reagent can be measured with DSC equipment. After the materials are mixed, compatibility can be shown in a DSC scan by showing differences in the $T_g$ peaks. Compatible materials have modified $T_g$'s, fully compatible materials will form a single $T_g$ peak in the scan. To match a polymer with a reagent or reagent group, measuring the surface energy of the materials using a goniometer will produce a surface energy quantity. Similar quantities will suggest compatibility.

The polymer compatible functional group on the cellulose naturally associates with the polymer using van der Waals' forces causing an increased compatibility, mixing or wetting of the polymer with the fiber.

Similarly, both the polymer and the cellulosic material can be derivatized with functional groups that increase the polymer fiber compatibility. Further, the functional groups can have moieties on the functional group that are compatible with the corresponding moiety. The increased compatibility of polymer and fiber after modification can be obtained by measuring the DSC properties or surface energy of the modified polymer/fiber, the polymer/modified fiber or the modified polymer/modified fiber when compared to the polymer/fiber material alone. Such materials with increased compatibility have improved thermodynamic properties and reduced energy of mixing.

The resulting modified materials remain completely thermoplastic because they are substantially free of any substantial crosslinking of fiber-to-fiber or polymer-to-fiber. Further, the material once manufactured can be extruded in the form of a thermoplastic pellet which can then be subject to heat and pressure and molded using either extrusion technology or thermoforming technology into window and door structural members. The wood fiber preferably comprises sawdust or milling byproduct waste stream from milling wooden members in window manufacture and can be contaminated with substantial proportions of hot melt adhesive, paint, solvent or adhesive components, preservatives, polyvinyl chloride recycle pigment, plasticizers, etc. We have found that the PVC and wood fiber composite can be manufactured into acceptable substitutes for wooden members if the PVC and wood material contains less than about 10 wt-%, preferably less than 3.5% water based on pellet weight. Water is removed by degassing (removing water vapor) during melt processing of the composite. The compositions can achieve, in a final product, high modulus, improved creep resistance, improved heat distortion temperature, high compressive strength, reproducible, stable dimensions, a superior modulus and elasticity. We have also found that the successful manufacture of structural members for windows and doors requires the preliminary manufacture of the polyvinyl chloride wood fiber composite in the form of a pellet wherein the materials are intimately mixed and contacted in forming the pellet prior to the extrusion of the members from the pellet material. We have found that the intimate mixing of polyvinyl chloride and wood fiber of increased compatibility (and optionally waste) in the manufacture of the pellet process with associated control of moisture content produces a pelletized product that is uniquely adapted to the extrusion manufacture of PVC/wood fiber components and achieves the manufacture of a useful wood replacement product. The materials of the invention are free of an effective quantity of a plasticizer. Such materials can only reduce the ultimate mechanical strength of the material. Further the material is formulated with proportions of materials that remain fully thermoplastic and recyclable in normal melt processing.

DETAILED DESCRIPTION OF THE INVENTION

The invention relates to the use of a modified polyvinyl chloride, a modified wood fiber or both, in a composite material. The preferred material has a controlled water content. The material is preferably made in the form of a pelletized compatible material wherein the wood fiber is intimately contacted and wetted by the organic materials due to increased compatibility. The intimate contact and wetting between the components in the pelletizing process ensures high quality physical properties in the extruded composite materials after manufacture.

Modified Polymer

The preferred material is a polymer comprising vinyl chloride. A modified polymer, as defined below, can be used with modified or unmodified cellulose. Unmodified polymer can be used only with a modified adhesive fiber.

Polyvinyl chloride is a common commodity thermoplastic polymer. Vinyl chloride monomer is made from a variety of different processes such as the reaction of acetylene and hydrogen chloride and the direct chlorination of ethylene. Polyvinyl chloride is typically manufactured by the free radical polymerization of vinyl chloride resulting in a useful thermoplastic polymer. After polymerization, polyvinyl chloride is commonly combined with thermal stabilizers, lubricants, plasticizers, organic and inorganic pigments, fillers, biocides, processing aids, flame retardants and other commonly available additive materials. Polyvinyl chloride can also be combined with other vinyl monomers in the manufacture of polyvinyl chloride copolymers. Such copolymers can be linear copolymers, branched copolymers, graft copolymers, random copolymers, regular repeating copolymers, heteric copolymers and block copolymers, etc. Monomers that can be combined with vinyl chloride to form vinyl chloride copolymers include a acrylonitrile; alpha-olefins such as ethylene, propylene, etc.; chlorinated monomers such as vinylidene dichloride, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Such monomers can be used in an amount of up to but less than about 50 mol-%, the balance being vinyl chloride. Polymer blends or polymer alloys can also be useful in manufacturing the pellet or linear extrudate of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature ($T_g$). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented. Polyvinyl chloride forms a number of known polymer alloys including, for example, polyvinyl chloride/nitrile rubber; polyvinyl chloride and related chlorinated copolymers and terpolymers of polyvinyl chloride or vinylidene dichloride; polyvinyl chloride/alphamethyl styrene-acrylonitrile copolymer blends; polyvinyl chloride/polyethylene; polyvinyl chloride/chlorinated polyethylene and others.

The primary requirement for the substantially thermoplastic polymeric material is that it retain sufficient thermoplastic properties to permit melt blending with wood fiber, permit formation of linear extrudate pellets, and to permit the composition material or pellet to be extruded or injection molded in a thermoplastic process forming the rigid structural member. Polyvinyl chloride homopolymers copolymers and polymer alloys are available from a number of manufacturers including B. F. Goodrich, Vista, Air Products, Occidental Chemicals, etc. Preferred polyvinyl chloride materials are polyvinyl chloride homopolymer having a molecular weight (Mn) of about 90,000±50,000, most preferably about 88,000±10,000.

Modifications

The polyvinyl chloride material is modified to introduce pendant groups that can form hydrogen bonds with the cellulosic hydroxyl groups. Cellulose molecules are known to be polymers of glucose with varying branching and molecular weight. Glucose molecules contain both secondary and primary hydroxyl groups and many such groups are available for hydrogen bonding.

The modified polyvinyl chloride comprises either a polymer comprising vinyl chloride and a second monomer having functional groups that are capable of forming hydrogen bonds with cellulose. Further, the modified polymer can comprise a polymer comprising vinyl chloride and optionally a second monomer that is reacted with the modifying reagent that can form substituents having hydrogen bonding functional groups.

Polymer Modifications

The polyvinyl chloride polymer material can be modified either by grafting onto the polymer backbone a reactive moiety compatible with the cellulose or by incorporating into the polymer backbone, by copolymerization techniques, functional groups that can increase polymer compatibility. It should be clearly understood that the PVC cellulosic fiber compatibility is relatively good. Wood fiber and polyvinyl chloride polymer will mix under conditions achievable in modern extrusion equipment. However, the compatibility of long chain modifications to the cellulosic polymer material provides significantly enhanced tensile strength.

Representative examples of monomers that can be included as a minor component (less than 50 mol-%) in a polyvinyl chloride copolymer include vinyl alcohol (hydrolyzed polyvinyl acetate monomer), maleic anhydride monomer, glycidyl methacrylate, vinyl oxazolines, vinyl pyrrolidones, vinyl lactones, and others. Such monomers when present at the preferred concentration (less than 10 mol-%, preferably less than 5 mol-%) react covalently with cellulose hydroxyl groups and form associative bonds with cellulosic hydroxyl groups resulting in increased compatibility but are not sufficiently reacted to result in a crosslinked material. The polyvinyl chloride polymer material can be grafted with a variety of reactive compositions. In large part, the reactive species has a primary or secondary nitrogen, an oxygen atom, or a carboxyl group that can both covalently bond (to a small degree) and form hydroxyl groups with cellulosic materials. Included within the useful reactive species are N-vinyl pyrrolidone, N-vinyl pyridine, N-vinyl pyrimidine, polyvinyl alcohol polymers, unsaturated fatty acids, acrylic acid, methacrylic acid, reactive acrylic oligomers, reactive amines, reactive amides and others. Virtually any reactive or grafting species containing a hydrogen bonding atom can be used as a graft reagent for the purposes of this invention.

Modified Fiber

Wood fiber, in terms of abundance and suitability can be derived from either soft woods or evergreens or from hard woods commonly known as broad leaf deciduous trees. Soft woods are generally preferred for fiber manufacture because the resulting fibers are longer, contain high percentages of lignin and lower percentages of hemicellulose than hard woods. While soft wood is the primary source of fiber for the invention, additional fiber make-up can be derived from a number of secondary or fiber reclaim sources including bamboo, rice, sugar cane, and recycled fibers from newspapers, boxes, computer printouts, etc.

However, the primary source for wood fiber of this invention comprises the wood fiber by-product of sawing or milling soft woods commonly known as sawdust or milling tailings. Such wood fiber has a regular reproducible shape and aspect ratio. The fibers based on a random selection of about 100 fibers are commonly at least 3 mm in length, 1 mm in thickness and commonly have an aspect ratio of at least 1.8. Preferably, the fibers are 1 to 10 mm in length, 0.3 to 1.5 mm in thickness with an aspect ratio between 2 and 7, preferably 2.5 to 6.0. The preferred fiber for use in this invention are fibers derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines which selectively removes wood from the piece leaving the useful shape. Such milling operations produces substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber sources of the invention can be blended regardless of particle size and used to make the composite. The fiber stream can be pre-sized to a preferred range or can be sized after blending. Further, the fiber can be pre-pelletized before use in composite manufacture.

Such sawdust material can contain substantial proportions of waste stream by-products. Such by-products include waste polyvinyl chloride or other polymer materials that have been used as coating, cladding or envelope on wooden members; recycled structural members made from thermoplastic materials; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc., and other waste streams common in the manufacture of wooden doors and windows. The total waste stream content of the wood fiber materials is commonly less than 25 wt-% of the total wood fiber input into the polyvinyl chloride wood fiber product. Of the total waste recycle, approximately 10 wt-% of that can comprise a vinyl polymer commonly polyvinyl chloride. Commonly, the intentional recycle ranges from about 1 to about 25 wt-%, preferably about 2 to about 20 wt-%, most commonly from about 3 to about 15 wt-% of contaminants based on the sawdust.

Modifications

The modified cellulosic material of the invention that can be combined with polymer material to form the preferred composite material comprises a cellulosic fiber having surface moieties containing substituent groups having a polarity and composition that matches the polyvinyl chloride material. In a preferred mode the chemical modifier comprises long chain groups that can entangle or associate with the polymer to increase compoatability. Such chains are typically polymeric but can also be long ($C_{6-36}$) aklyl groups.

As discussed above, compatible polymeric species that can associate with polyvinyl chloride polymers in improving compatibility can be found using either differential scanning calorimetry or surface energy (goniometer) data. Examples of compatible polymer species that can be grafted onto a cellulosic molecule for increasing compatibility include acrylonitrile butadiene styrene polymers, maleic anhydride butadiene styrene polymers, chlorinated polyethylene polymers, styrene acrylonitrile polymers, alpha styrene acrylonitrile polymers, polymethyl methacrylate polymers, ethylene vinyl acetate polymers, natural rubber polymers, a variety of thermoplastic polyurethane polymers, styrene maleic anhydride polymers, synthetic rubber elastomers, polyacrylicimide polymers, polyacrylamide polymers, polycaprolactone polymers, poly(ethylene-adipate). Such polymeric groups can be reacted with other reactive species to form on the polymeric backbone a group reactive with a cellulosic hydroxyl group to result in a modified cellulose material. Such functional groups include carboxylic anhydrides, epoxides (oxirane), carboxylic acids, carboxylic acid chlorides, isocyanate, lactone, alkyl chloride, nitrile, oxazoline, azide, etc.

Pellet

The polyvinyl chloride and wood fiber can be combined and formed into a pellet using a thermoplastic extrusion processes. Wood fiber, modified or unmodified, can be introduced into pellet making process in a number of sizes. We believe that the wood fiber should have a minimum size of length and width of at least 1 mm because wood flour tends to be explosive at certain wood to air ratios. Further, wood fiber of appropriate size of a aspect ratio greater than 1 tends to increase the physical properties of the extruded structural member. However, useful structural members can be made with a fiber of very large size. Fibers that are up to 3 cm in length and 0.5 cm in thickness can be used as input to the pellet or linear extrudate manufacturing process. However, particles of this size do not produce highest quality structural members or maximized structural strength. The best appearing product with maximized structural properties are manufactured within a range of particle size as set forth below. Further, large particle wood fiber an be reduced in size by grinding or other similar processes that produce a fiber similar to sawdust having the stated dimensions and aspect ratio. One further advantage of manufacturing sawdust of the desired size is that the material can be pre-dried before introduction into the pellet or linear extrudate manufacturing process. Further, the wood fiber can be pre-pelletized into pellets of wood fiber with small amounts of binder if necessary.

During the pelletizing process for the composite pellet, the polyvinyl chloride in an appropriate modification if modified and wood fiber are intimately contacted at high temperatures and pressures to insure that the wood fiber and polymeric material are wetted, mixed and extruded in a form such that the polymer material, on a microscopic basis, coats and flows into the pores, cavity, etc., of the fibers. The fibers are preferably substantially oriented by the extrusion process in the extrusion direction. Such substantial orientation causes overlapping of adjacent parallel fibers and polymeric coating of the oriented fibers resulting a material useful for manufacture of improved structural members with improved physical properties. The degree of orientation is about 20%, preferably 30% above random orientation which is about 45 to 50%. The structural members have substantially increased strength and tensile modulus with a coefficient of thermal expansion and a modulus of elasticity that is optimized for window and doors. The properties are a useful compromise between wood, aluminum and neat polymer.

Moisture control is an important element of manufacturing a useful linear extrudate or pellet. Depending on the equipment used and processing conditions, control of the water content of the linear extrudate or pellet can be important in forming a successful structural member substantially free of internal voids or surface blemishes. The concentration of water present in the sawdust during the formation of pellet or linear extrudate when heated can flash from the surface of the newly extruded structural member and can come as a result of a rapid volatilization, form a steam bubble deep in the interior of the extruded member which can pass from the interior through the hot thermoplastic extrudate leaving a substantial flaw. In a similar fashion, surface water can bubble and leave cracks, bubbles or other surface flaws in the extruded member.

Trees when cut depending on relative humidity and season can contain from 30 to 300 wt-% water based on fiber content. After rough cutting and finishing into sized. lumber, seasoned wood can have a water content of from 20 to 30 wt-% based on fiber content. Kiln dried sized lumber cut to length can have a water content typically in the range of 8 to 12%, commonly 8 to 10 wt-% based on fiber. Some wood source, such as poplar or aspen, can have increased moisture content while some hard woods can have reduced water content.

Because of the variation in water content of wood fiber source and the sensitivity of extrudate to water content control of water to a level of less than 8 wt-% in the pellet based on pellet weight is important. Structural members extruded in non-vented extrusion process, the pellet should be as dry as possible and have a water content between 0.01 and 5%, preferably less than 3.5 wt-%. When using vented equipment in manufacturing the extruded linear member, a water content of less than 8 wt-% can be tolerated if processing conditions are such that vented extrusion equipment can dry the thermoplastic material prior to the final formation of the structural member of the extrusion head.

The pellets or linear extrudate of the invention are made by extrusion of the polyvinyl chloride and wood fiber composite through an extrusion die resulting in a linear extrudate that can be cut into a pellet shape. The pellet cross-section can be any arbitrary shape depending on the extrusion die geometry. However, we have found that a regular geometric cross-sectional shape can be useful. Such regular cross-sectional shapes include a triangle, a square, a rectangle, a hexagonal, an oval, a circle, etc. The preferred shape of the pellet is a regular cylinder having a roughly circular or somewhat oval cross-section. The pellet volume is preferably greater than about 12 mm$^3$. The preferred pellet is a right circular cylinder, the preferred radius of the cylinder is at least 1.5 mm with a length of at least 1 mm. Preferably, the pellet has a radius of 1 to 5 mm and a length of 1 to 10 mm. Most preferably, the cylinder has a radius of 2.3 to 2.6 mm, a length of 2.4 to 4.7 mm, a volume of 40 to 100 mm$^3$, a weight of 40 to 130 mg and a bulk density of about 0.2 to 0.8 gm/mm$^3$.

We have found that the interaction, on a microscopic level, between the increased compatible polymer mass and the wood fiber is an important element of the invention. We have found that the physical properties of an extruded member are improved when the polymer melt during extrusion of the pellet or linear member thoroughly wets and penetrates the wood fiber particles improved wetting and penetration is a result of increased compatibility. The thermoplastic material comprises an exterior continuous organic polymer phase with the wood particle dispersed as a discontinuous phase in the continuous polymer phase. The material during mixing and extrusion obtains an aspect ratio of at least 1.1 and preferably between 2 and 4, optimizes orientation such as at least 20 wt-%, preferably 30% of the fibers are oriented in an extruder direction and are thoroughly mixed and wetted by the polymer such that all exterior surfaces of the wood fiber are in contact with the polymer material. This means, that any pore, crevice, crack, passage way, indentation, etc., is fully filled by thermoplastic material. Such penetration as attained by ensuring that the viscosity of the polymer melt is reduced by operations at elevated temperature and the use of sufficient pressure to force the polymer into the available internal pores, cracks and crevices in and on the surface of the wood fiber.

During the pellet or linear extrudate manufacture, substantial work is done in providing a uniform dispersion of the wood into the polymer material. Such work produces substantial orientation which when extruded into a final structural member, permits the orientation of the fibers in the structural member to be increased in the extruder direction resulting in improved structural properties.

The pellet dimensions are selected for both convenience in manufacturing and in optimizing the final properties of the extruded materials. A pellet is with dimensions substantially less than the dimensions set forth above are difficult to extrude, pelletize and handle in storage. Pellets larger than the range recited are difficult to introduce into extrusion or injection molding equipment, and are different to melt and form into a finished structural member.

Composition and Pellet Manufacture

In the manufacture of the composition and pellet of the invention, the manufacture and procedure requires two important steps. A first blending step and a second pelletizing step.

During the blending step, the polymer and wood fiber are intimately mixed by high shear mixing components with recycled material to form a polymer wood composite wherein the polymer mixture comprises a continuous organic phase and the wood fiber with the recycled materials forms a discontinuous phase suspended or dispersed throughout the polymer phase. The manufacture of the dispersed fiber phase within a continuous polymer phase requires substantial mechanical input. Such input can be achieved using a variety of mixing means including preferably extruder mechanisms wherein the materials are mixed under conditions of high shear until the appropriate degree of wetting and intimate contact is achieved. After the materials are fully mixed, the moisture content can be controlled at a moisture removal station. The heated composite is exposed to atmospheric pressure or reduced pressure at elevated temperature for a sufficient period of time to remove moisture resulting in a final moisture content of about 8 wt-% or less. Lastly, the polymer fiber is aligned and extruded into a useful form.

The preferred equipment for mixing and extruding the composition and wood pellet of the invention is an industrial extruder device. Such extruders can be obtained from a variety of manufacturers including Cincinnati Millicron, etc.

The materials feed to the extruder can comprise from about 30 to 50 wt-% of sawdust including recycled impurity along with from about 50 to 70 wt-% of polyvinyl chloride polymer compositions. Preferably, about 35 to 45 wt-% wood fiber or sawdust is combined with 65 to 55 wt-% polyvinyl chloride homopolymer. The polyvinyl chloride feed is commonly in a small particulate size which can take the form of flake, pellet, powder, etc. Any polymer form can be used such that the polymer can be dry mixed with the sawdust to result in a substantially uniform pre-mix. The wood fiber or sawdust input can be derived from a number of plant locations including the sawdust resulting from rip or cross grain sawing, milling of wood products or the intentional commuting or fiber manufacture from waste wood scrap. Such materials can be used directly from the operations resulting in the wood fiber by-product or the by-products can be blended to form a blended product. Further, any wood fiber material alone, or in combination with other wood fiber materials, can be blended with waste stream by-product from the manufacturer of wood windows as discussed above. The wood fiber or sawdust can be combined with other fibers and recycled in commonly available particulate handling equipment.

Polymer and wood fiber are then dry blended in appropriate proportions prior to introduction into blending equipment. Such blending steps can occur in separate powder handling equipment or the polymer fiber streams can be simultaneously introduced into the mixing station at appropriate feed ratios to ensure appropriate product composition.

In a preferred mode, the wood fiber is placed in a hopper, controlled by weight or by volume, to meter the sawdust at a desired volume while the polymer is introduced into a similar hopper have a gravametric metering input system. The weights are adjusted to ensure that the composite material contains appropriate proportions on a weight basis of polymer and wood fiber. The fibers are introduced into a twin screw extrusion device. The extrusion device has a mixing section, a transport section and melt section. Each section has a desired heat profile resulting in a useful product. The materials are introduced into the extruder at a rate of about 600 to about 4000 pounds of material per hour and are initially heated to a temperature of about 215–225° C. In the intake section, the stage is maintained at about 215° C. to 225° C. In the mixing section, the temperature of the twin screw mixing stage is staged beginning at a temperature of about 205–215° C. leading to a final temperature in the melt section of about 195–205° C. at spaced stages. Once the material leaves the blending stage, it is introduced into a three stage extruder with a temperature in the initial section of 185–195° C. wherein the mixed thermoplastic stream is divided into a number of cylindrical streams through a head section and extruded in a final zone of 195–200° C. Such head sections can contain a circular distribution (6–8" diameter) of 10 to 500 or more, preferably 20 to 250 orifices having a cross-sectional shape leading to the production of a regular cylindrical pellet. As the material is extruded from the head it is cut with a double-ended knife blade at a rotational speed of about 100 to 400 rpm resulting in the desired pellet length.

The following examples were performed to further illustrate the invention that is explained in detail above. The following information illustrates the typical production conditions and compositions and the tensile modulus of a structural member made from the pellet. The following examples and data contain a best mode.

COMPARATIVE EXAMPLES-UNMODIFIED PVC-FIBER COMPOSITE

A Cincinnati millicron extruder with an HP barrel, Cincinnati pelletizer screws, an AEG K-20 pelletizing head with 260 holes, each hole having a diameter of about 0.0200 inches was used to make the pellet. The input to the pelletizer comprised approximately 60 wt-% polymer and 40 wt-% sawdust. The polymer material comprises a thermoplastic mixture of approximately 100 parts of polyvinyl chloride homopolymer (in. weight of 88,000±2000), about 15 parts titanium dioxide, about 2 parts ethylene bis-stearamide wax lubricant, about 1.5 parts calcium stearate, about 7.5 parts Rohm & Haas 980 T acrylic resin impact modifier/process aid and about 2 parts of dimethyl tin thioglycolate. The sawdust comprises a wood fiber particle containing about 5 wt-% recycled polyvinyl chloride having a composition substantially identical to that recited above.

The initial melt temperature in the extruder was maintained between 180° C. and 210° C. The pelletizer was operated at a polyvinyl chloride-sawdust composite combined through put of 800 pounds per hour. In the initial extruder feed zone, the barrel temperature was maintained between 215–225° C. In the intake zone, the barrel was maintained at 215–225° C., in the compression zone the temperature was maintained at between 205–215° C. and in the melt zone the temperature was maintained at 195–205° C. The die was divided into three zones, the first zone at 185–195° C., the second die zone at 185–195° C. and in the final die zone at 195–205° C. The pelletizing head was operated at a setting providing 100 to 300 rpm resulting in a pellet with a diameter of 5 mm and a length of about 1–10 mm.

EXPERIMENTAL
Sample Preparation for Styrene Maleic*
Anhydride Compatibilizer Formulation

| Run number | Composition (parts by weight) | | |
|---|---|---|---|
| | PVC compound | saw dust | SMA |
| 1 | 100 | 0 | 0 |
| 2 | 100 | 0 | 10 |
| 3 | 90 | 10 | 0 |
| 4 | 90 | 10 | 10 |
| 5 | 75 | 25 | 0 |
| 6 | 75 | 25 | 10 |
| 7 | 60 | 40 | 0 |
| 8 | 60 | 40 | 10 |
| 9 | 50 | 50 | 0 |
| 10 | 50 | 50 | 10 |

*In the following work the modifier is referred to by these numbers.

1. SMA used was a random copolymer of styrene and maleic anhydride from ARCO Chemical Company, Dylark 332 with 14% maleic anhydride, MW=190,000
2. VERR40 is a terpolymer of Vinylchloride-vinylacetate-glycidyl methacrylate (82%-9%-9%) with an epoxy functionality of 1.8% by weight
3. Terpolymer used was "Vinyl chloride-vinyl acetate-vinyl alcohol" (91%-3%-6%) from Scientific Polymer Products, Inc., MW=70,000.
4. Epoxy used was Dows' DER332 which is a Diglycidyl bisphenol A epoxy
5. Catalyst used was Triethylene amine from Aldrich Chemical Company
6. ATBN rubber used was Goodrich's "HYCAR 1300X45" which is an "amine terminated butadiene acrylonitrile copolymer 1. Sawdust Preparation
   Ponderosa Pine Sawdust ground and sieved to provide 80% 40–60 mesh and <15% fines
   Sawdust is dried to <1% moisture
2. PVC Compound
   100 parts of Geon Resin 427 and 1 part of a methyltin mercaptide (Advastab TM 181 Methyltin Mercaptide) are blended in a high intensity mixer to temperature of 150° F. 1.7 parts of a fatty acid ester (Loxiol VGE 1884, and 0.4 part of an oxidized polyethylene (AC 629-A) are added and the PVC compound is mixed for an additional 4 minutes. (Standard Mixing procedures)
3. Styrene Maleic Anhydride
   The SMA was Dylark 332 from ARCO chemical contains 14–15% maleic anhydride and molecular weight of approximately 170,000
4. 2×5 full factorial matrix
   SMA was either 0, or 10 parts
   Sawdust was 0, 10, 25, 40, or 50 parts
   PVC varied inversely with the sawdust 100, 90, 75, 60, or 50 parts such that the PVC and saw dust parts added up to 100 parts
5. Mixing of PVC, Sawdust, and SMA
   Mixing of PVC, Sawdust, and SMA was done on a Hobart "dough" mixer.
6. Extrusion
   The formulations were fed into a twin screw counter rotating extruder and extruded as a 1"×0.1" strip.
7. Second Pass through Extruder
   Strips from #6 above were ground into pellets with a Cumberland grinder and fed into the twin screw extruder for a second time.

Tensile Testing

Tensile testing was performed in accordance with ASTM Method 3039M on an Instron 4505

TABLE 1

| | Composition (parts by weight) | | | Tensile Properties | | |
|---|---|---|---|---|---|---|
| Run number | PVC compound | saw dust | SMA | Modulus | % strain @ max load | stress |
| 1 | 100 | 0 | 0 | 536,533 | 2.772 | |
| 2 | 100 | 0 | 10 | 494,010 | 2.535 | |
| 3 | 90 | 10 | 0 | 579,925 | 2.746 | |
| 4 | 90 | 10 | 10 | 573,448 | 2.452 | |
| 5 | 75 | 25 | 0 | 829,455 | 1.819 | |
| 6 | 75 | 25 | 10 | 844,015 | 1.548 | |
| 7 | 60 | 40 | 0 | 1,112,819 | 1.145 | |
| 8 | 60 | 40 | 10 | 1,039,749 | 1.168 | |
| 9 | 50 | 50 | 0 | 1,254,213 | 0.843 | |
| 10 | 50 | 50 | 10 | 1,174,936 | 0.965 | |

These data show the chemical modification has no significant impact on modulus, but has a significant increase in both % strain and in stress values.

Soxhlet Extraction

Five gram samples from test strips were extracted for 24 hours with hot tetrahydrofuran to determine percent resin bound to sawdust.

| PVC | WF | SMA | % Retain |
|---|---|---|---|
| NNC3 | 2% M.C. | — | 38.83 |
| NNC3 | 2% M.C. | 332–10% | 43.88 |
| NNC3 | wet, 40% | — | 41.21 |
| NNC3 | wet, 40% | 332–10% | 47.25 |
| NNC3 | wet, 40% | Butadiene-Man | 48.39 |
| NNC3 | 0 | SMA332 | 30.61 |

These data show that the SMA reacts with and is bonded to the wood fiber to increase compatibility.

Sawdust was 0 or 40 parts PVC+the VERR-40 varied inversely with the sawdust 100, or 60, parts such that the PVC+VERR-40 and sawdust parts added up to 100 parts.

5. Mixing of PVC, Sawdust, and VERR-40

Mixing of PVC, Sawdust, and VERR-40 was done on a Hobart "dough" mixer.

The VERR-40 was diluted with an additional 50 ml acetone and added to the sawdust first and mixed to provide even dispersion of VERR-40 on the sawdust.

Then the PVC was added with continued mixing.

6. Extrusion

The formulations were fed into a twin screw counter rotating extruder and extruded as a 1"×0.1" strip.

7. Tensile Testing

Tensile testing was performed in accordance with ASTM method D3039 on an Instron 4505

| | | | | Tensile Properties | | |
|---|---|---|---|---|---|---|
| | Composition (parts by weight) | | | | % strain @ | |
| Run number | PVC compound | saw dust | VERR-40 | Modulus | max load | stress |
| 1 | 100 | 0 | 0 | 501,236 | 3.301 | 8458.6 |
| 2 | 96 | 0 | 4 | 488,245 | 2.741 | 7493.7 |
| 3 | 90 | 0 | 10 | 459,835 | 2.951 | 6833 |
| 4 | 60 | 40 | 0 | 1,143,393 | 0.949 | 6384.5 |
| 5 | 57.6 | 40 | 2.4 | 1,230,761 | 0.961 | 6688.9 |
| 6 | 54 | 40 | 6 | 1,273,530 | 0.889 | 6969.3 |

These data show significant improvement in stress with no substantial loss in modulus.

Sample Preparation for Vinyl Chloride Vinyl Acetate Glycidyl Methacrylate Compatibilizer Formulation

| | Composition (parts by weight) | | |
|---|---|---|---|
| Run number | PVC compound | saw dust | VERR-40 |
| 1 | 100 | 0 | 0 |
| 2 | 96 | 0 | 4 |
| 3 | 90 | 0 | 10 |
| 4 | 60 | 40 | 0 |
| 5 | 57.6 | 40 | 2.4 |
| 6 | 54 | 40 | 6 |

1. Sawdust Preparation

Ponderosa Pine Sawdust ground and sieved to provide 80% 40–60 mesh and <15% fines.

Sawdust is dried to <1% moisture

2. PVC Compound 100 parts of Geon Resin 427 and 2 parts of a methyltin mercaptide (Advastab TM 181 Methyltin Mercaptide) are blended in a high intensity mixer to temperature of 150° F. 0.5 parts of a paraffin wax (XL 165), 0.8 parts of an oxidized polyethylene (AC 629-A) are added and the PVC compound is mixed for an additional 4 minutes (Standard Mixing procedures)

3. Vinyl Chloride Vinyl Acetate glycidyl methacrylate

The Vinyl Chloride Vinyl Acetate glycidyl methacrylate (82%-9%-9% by mole) was UCAR VERR-40 from Union Carbide Chemicals and Plastics contains 9% glycidyl methacrylate and comes as a 40% solution in toluene and methyl ethyl ketone.

4. 2×3 full factorial matrix

VERR-40 was either 0, 4, or 10 parts of the PVC compound based on the weight of the solids.

8. Soxhlet Extraction

Five gram samples from test strips were extracted for 24 hours with hot tetrahydrofuran to determine percent resin bound to sawdust. Only samples of 40% sawdust were extracted. The initial weight minus the retain after extraction—the weight of the sawdust gives the amount of resin attached to the wood.

| Soxhlet Extraction Data | |
|---|---|
| Composite with 40% sawdust | Percent resin retain |
| 10% VERR-40 | 5.6 |
| 4% VERR-40 | 2.6 |
| 10% SMA #1 | 7.4 |
| Control | 1.0 |

Fusion bowl data confirm the covalent reaction between wood fiber and SMA #1 resin. An increase in the equilibrium torque shows substantial reaction. In case 1, no fiber is used. In case 2, fiber is combined with no reactive resin and polystyrene a nonreactive resin. The equilibrium torque in the presence of fiber and substantial quantities of reactive SMA resin shows a 52% increase. Similar data is shown in case 3 using fiber and a styrene maleic anhydride modifier material.

The following data shows that modified polyvinyl chloride polymer can also improve physical properties of the composite material. Further, the data shows the thermoplastic nature of the modified material. The modified material can be formed in a modified state, ground and reprocessed under thermoplastic conditions with no substantial change in physical properties.

Fusion Bowl Data
Compound: PVC, TM181 1phr*, calcium stearate
1.5phr, oxidized polyethylene, 0.8phr, Paraffin 0.8phr

| Additive | AWF | Eq. Tqe | % Increase |
|---|---|---|---|
| Case 1 | | | |
| — | — | 2135 | 0.00 |
| (1) 10% SMA 332 | — | 2182 | 2.20 |
| 10% PS | — | 1598 | -25.15 |
| Case 2 | | | |
| — | 40% Dried | 1795 | 0.00 |
| (1) 10% SMA 332 | 40% Dried | 2730 | 52.09 |
| 10% PS | 40% Dried | 1891 | 5.35 |
| Case 3 | | | |
| — | 40% Dried | 1883 | 0.00 |
| (1) 10% SMA 332 | 40% Dried | 3799 | 101.75 |
| (3) 10% PolySci SMA | 40% Dried | 3926 | 108.50 |

* phr = parts per hundred parts resin

Fusion Bowl Operation:

Fusion bowl is a Brabender mixer of the type 6 with roller blades. The mixer was heated to 185° C. A charge of 62 grams was fed into the mixer with the blades rotating at 65 rpm. Automatic data acquisition software facilitated continuous recording of torque and material temperature. Any chemical interaction such as bonding between the compatibilizer and the sawdust results in an increase in the torque. Too much reaction would increase the torque and thus the temperature to an extent that PVC degrades. PVC degradation shows up as discoloration to black and also HCL fumes. Thus the fusion bowl can be used to monitor reactions between various ingredients.

Vinyl Chloride Terpolymer

A conventional polyvinyl chloride wood fiber composite as shown above in the comparative examples was modified using a vinyl chloride/vinyl acetate/vinyl alcohol #3 terpolymer (91%-3%-6% by mole) MW=70,000, coupled with a diglycidyl bisphenol A (DERR 332). The following data table shows the presence of the terpolymer improves tensile stress with no substantial loss in modulus.

| (3) Terpolymer | Modulus | Elongation | Stress |
|---|---|---|---|
| 0 | 1045094 | 1.173 | 5896 |
| 3 | 1056674 | 1.054 | 6637 |
| 5 | 1046822 | 1.121 | 6351 |
| 8 | 1027874 | 1.155 | 6452 |
| 10 | 1047205 | 1.096 | 6715 |
| 0 | 1047415 | 1.121 | 6206 |
| 3 | 1039648 | 1.034 | 6421 |
| 5 | 1069781 | 1.037 | 6909 |
| 8 | 1052043 | 1.056 | 7237 |

We have found that an increase in impact strength is obtained by adding a compatibilizing agent containing a rubber molecule moiety. The material is terpolymer as above coupled with the rubber and polymer with and epoxy diamine HYCAR1300X45 terminated butadiene acrylonitrile rubber component HYCAR1300X45. The use of the rubber containing chemical modifier substantially increases the impact strength.

| Terpolymer | Epoxy | TEA | Impact Strength |
|---|---|---|---|
| 6 | 5.64 | 0 | 8.0/0.6 |
| 6 | 5.64 | 15 | |
| (6) 1% ATBN, applied to sawdust | | | |
| 6 | 5.64 | 0 | |
| 6 | 5.64 | 15 | 10.4/0.4 |

Similarly, the materials shown in the table below were manufactured and recycled as shown. Pass 1 shows that the modified material has a similar tensile stress elongation and modulus as the other materials in the table. Pass 2 is a second extrusion of the material of pass 1. The physical properties are not different significantly showing substantial thermoplastic character.

| Terpolymer | Epoxy | TEA | Modulus | Elongation | Tensile Stress |
|---|---|---|---|---|---|
| 0 | 0 | 0 | 1033518 | 1.08 | 5826 |
| 0 | 0 | 0 | 1036756 | 1.056 | 5889 |
| 5 | 0 | 0 | 1045985 | 1.049 | 6325 |
| Pass 1 5 | 3 | 15 | 1073853 | 0.98 | 7001 |
| Pass 2 5 | 3 | 15 | 1098495 | 1.007 | 7150 |

Similarly, a terpolymer comprising vinyl chloride vinyl acetate and vinyl alcohol is coupled with the polymer using an epoxy functionality VERR40 (1.8 wt %). The use of such a material as a polymer modifier results in a substantial increase in tensile strength. Data supporting this conclusion is shown in the following table.

| (3) Terpolymer | (4) Epoxy | (5) TEA | Modulus | Elongation at max load | Stress max load |
|---|---|---|---|---|---|
| 0 | 0 | 0 | 1048353 | 1.114 | 5990 |
| 0 | 0 | 15 | 1059081 | 1.032 | 6233 |
| 0 | 4 | — | 994857 | 1.07 | 5735 |
| 0 | 4 | 15% | 1089991 | 0.997 | 6500 |
| 6 | 0 | — | 1059950 | 1.084 | 6610 |
| 6 | 0 | 15% | 1054579 | 1.04 | 6895 |
| 3 | 3 | — | 1104357 | 1.059 | 6174 |
| 3 | 3 | 15% | 1142600 | 0.988 | 6701 |
| 5 | 3 | — | 1092483 | 0.998 | 6299 |
| 5 | 3 | 15% | 1106976 | 0.979 | 6952 |
| 8 | 3 | — | 1104892 | 1.005 | 6438 |
| 8 | 3 | 15% | 1126601 | 0.988 | 7093 |
| 8 | 5 | — | 1288699 | 0.908 | 6497 |
| 8 | 5 | 15% | 1111775 | 0.907 | 7123 |
| 5 | 5 | — | 1137586 | 0.963 | 6383 |
| 5 | 5 | 15% | 1115420 | 0.923 | 7105 |
| 3 | 5 | — | 1110601 | 0.972 | 6163 |
| 3 | 5 | 15% | | | |

The foregoing disclosure provides an explanation of the compositions and properties of the modified Thermoplastic material. Many alterations, variations and modifications of the invention arising in the extruded material can be made by substitution of equivalent modifier materials, rearrangement of the compositions, variations of the proportions, etc. Accordingly, the invention resides in the claims hereinafter appended.

We claim:

1. A composite pellet, capable of formation into a structural member, which pellet comprises a cylindrical extrudate having a radius of about 1 to 5 mm, a length of about 1 to 10 mm;

the pellet composition comprising:
(a) a major proportion of a polymer comprising vinyl chloride;
(b) about 10 to 45 wt-% of chemically modified cellulosic fiber having a minimum thickness of 1 µm and a minimum length of 3 µm and a minimum aspect ratio of about 1.8; and wherein the fiber is chemically modified by a reagent that can covalently bond to a cellulosic hydroxyl, the reagent having a moiety that is compatible with the polymer, said fiber is dispersed throughout a continuous polymer phase and the tensile stress a failure is increased when compared to a composite with unmodified fiber.

2. The pellet of claim 1 wherein the polymer comprises a polyvinyl chloride homopolymer.

3. The pellet of claim 1 wherein the polymer comprises a polyvinyl chloride copolymer.

4. The pellet of claim 1 wherein the cellulosic fiber is wood fiber.

5. The pellet of claim 4 wherein the wood fiber comprises sawdust.

6. The pellet of claim 2 wherein the polymer has a number average molecular weight of about 90,000±50,000.

7. The pellet of claim 4 wherein the copolymer has a number average molecular weight of about 88,000±10,000.

8. The pellet of claim 1 wherein the wood fiber has a fiber width of about 0.3 to 1.5 mm, a fiber length of about 1 to 10 mm and an aspect ratio of about 2 to 7.

9. The pellet of claim 1 wherein water comprises about 0.01 to 5 wt-% of the pellet.

* * * * *